Oct. 27, 1925.
C. A. GRIMES
BEARING
Filed July 3, 1923
1,558,978
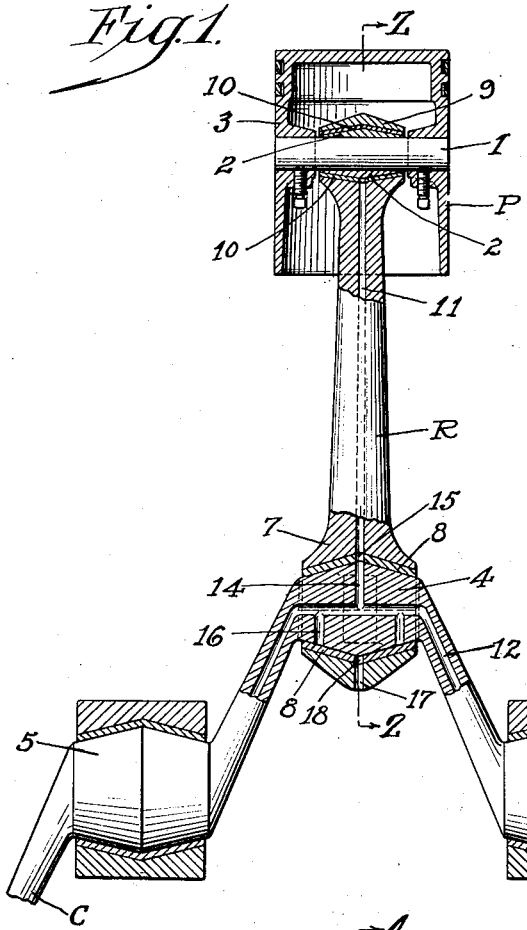
Inventor
Clinton A. Grimes
by Watson E. Coleman
Attorney Patented Oct. 27, 1925.

1,558,978

UNITED STATES PATENT OFFICE.

CLINTON A. GRIMES, OF CRUM LYNNE, PENNSYLVANIA.

BEARING.

Application filed July 3, 1923. Serial No. 649,268.

*To all whom it may concern:*

Be it known that I, CLINTON A. GRIMES, a citizen of the United States, residing at Crum Lynne, in the county of Delaware and State of Pennsylvania, have invented certain new and useful Improvements in Bearings, of which the following is a specification, reference being had to the accompanying drawings.

This invention relates to certain improvements in bearings and has relation more particularly to a bearing especially designed and adapted for use in connection with the connecting rod of an internal combustion engine or the like and it is an object of the invention to provide a novel and improved bearing whereby is substantially eliminated the clicks or knocks during the operation of the rod and also to assure the maintenance of the rod in proper alignment.

Another object of the invention is to provide a novel and improved bearing of this general character having associated therewith means whereby the desired lubrication of the various parts is facilitated and in a manner to avoid fouling of the spark plugs or the like.

The invention consists in the details of construction and in the combination and arrangement of the several parts of my improved bearing whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in section and partly in elevation illustrating a connecting rod and its associated piston and crank shaft provided with bearings constructed in accordance with an embodiment of my invention;

Figure 2 is a sectional view taken substantially on the line 2—2 of Figure 1.

Figure 3 is a fragmentary view partly in section and partly in elevation illustrating a further embodiment of my invention;

Figure 4 is a sectional view taken substantially on the line 4—4 of Figure 3.

In the embodiment of my invention as disclosed in Figure 1, P denotes a piston of a conventional type employed in connection with internal combustion engines and which has disposed therethrough in a well known manner a connecting pin 1. Before the pin 1 is applied a sleeve 2 is interposed between the bearings 3 for the pin 1 and through which the pin 1 is forced when applied. This sleeve 2 fits tight upon the pin.

C denotes a crank shaft of a general type and wherein the wrist pin 4 of each of the cranks is oppositely tapered from the center thereof. The sleeve 2 hereinbefore referred to is of a similar formation. The periphery of each bearing portion 5 of the crank shaft C is also oppositely tapered and the coacting portions of the associated bearings 6 are correspondingly formed so that during rotation of the shaft C the same is effectively held against endwise movement whereby each crank is maintained in a position for rotation in a fixed path of travel.

R denotes a connecting rod which has the bearing 7 at the crank end thereof correspondingly tapered as the pin 4 and interposed between the pin 4 and the bearing 7 is a bushing 8. The bearing 9 at the piston end of the rod is also tapered to correspond to the taper of the sleeve 2. Interposed between the bearing 9 and the sleeve 2 is a bushing 10. With the sleeve 2, pin 4 and the bearings 7 and 9 formed as herein disclosed, the rod R is effectively maintained in proper alignment as the rod R is effectively held against movement in a direction longitudinally of the pins 1 and 4. A further advantage of this arrangement resides in the fact that by avoiding such movement of the rod R clicking is prevented and which clicking causes the humming sound so generally noted in connection with motors, said humming sound being created by the rapid clicks.

The rod R has disposed axially therethrough the passage way or channel 11 which opens at the high points of the sleeve 2 and pin 4 or more particularly the bushings 8 and 10 respectively associated therewith. The crank shaft C has disposed therethrough the passage way or channel 12 and in communication with said passage way or channel 12 at the high point of the pin 4 and also if desired at the high point of each of the bearing portions 5 is a radially disposed passage way or channel 14.

This passage way or channel 14 is aligned with the passage way or channel 11, the bushing 8 having a suitable opening 15 to permit such communication to be free and unobstructed. The pin 4 adjacent the opposite end thereof is provided with the passage ways or channels 16 in communication with the passage way or channel 14 and disposed in a direction opposed to that of the passage way or channel 14 and delivering inwardly of the bushing 8.

Diametrically opposed to the passage way or channel 14 the pin 4 is provided with a passage way or channel 17 the same being open at its outer end and being continued through an opening 18 provided in the bushing 8.

When the engine is in operation the oil is carried through the various passage ways to the different bearings and bearing surfaces and the tendency of the oil as discharged upon the bearings or bushings associated therewith will be to work toward the center or high point of each of the pins 1 or 4 or bearing surfaces 5. The passage way or channel 17 will be of a size so that the oil will drip through it to prevent it from flying upward over the cylinder or against the spark plugs.

In the embodiment of my invention as illustrated in Figures 3 and 4 the passage ways or channels 17' have in communication therewith the dippers whereby the requisite oil for lubricating the bearing surfaces and bearings is obtained as the various cranks of the shaft C dip within the oil within the crank case. In this embodiment of my invention the passage ways or channels 17' are continued by the openings 19 in the adjacent bushing 8'. The bushings 8 and 10 may be made of bronze, babbitt or any other suitable material as the requirements of practice may prefer.

From the foregoing description it is thought to be obvious that a bearing constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with a wrist pin of a crank, said pin being oppositely tapered from the center thereof, said taper adding strength to the pin, a connecting rod having a bearing at the crank end thereof surrounding the pin and correspondingly tapered to snugly receive the wrist pin, the taper of the crank end bearing and the wrist pin holding the bearing against lateral play with respect to the wrist pin, said wrist pin being provided with means to deliver lubricant to the bearing, the bearing being provided with an opening therethrough opening at the high point thereof, said opening in the bearing providing a discharge for surplus lubricant, the delivery of the lubricant to the bearing being at opposite sides of the opening in the bearing and adjacent to the low points of the wrist pin, the means for delivering the lubricant constituting channels.

2. In combination with a wrist pin of a crank, said pin being oppositely tapered from the center thereof, said taper adding strength to the pin, a connecting rod having a bearing at the crank end thereof surrounding the pin and correspondingly tapered to snugly receive the wrist pin, the taper of the crank end bearing and the wrist pin holding the bearing against lateral play with respect to the wrist pin, said wrist pin being provided with means to deliver lubricant to the bearing, the bearing being provided with an opening therethrough opening at the high point thereof, said opening in the bearing providing a discharge for surplus lubricant, the delivery of the lubricant to the bearing being at opposite sides of the opening in the bearing and adjacent to the low points of the wrist pin.

3. In combination with a wrist pin of a crank, said pin being oppositely tapered from the center thereof, said taper adding strength to the pin, a connecting rod having a bearing at the crank end thereof surrounding the pin and correspondingly tapered to snugly receive the wrist pin, the taper of the crank end bearing and the wrist pin holding the bearing against lateral play with respect to the wrist pin, said wrist pin being provided with means to deliver lubricant to the bearing, the bearing being provided with an opening therethrough opening at the high point thereof, said opening in the bearing providing a discharge for surplus lubricant, the delivery of the lubricant to the bearing being at opposite sides of the opening in the bearing and adjacent to the low points of the wrist pin, said opening in the bearing being diametrically opposed to the rod.

In testimony whereof I hereunto affix my signature.

CLINTON A. GRIMES.